United States Patent [19]

Griffin et al.

[11] Patent Number: 5,271,438
[45] Date of Patent: Dec. 21, 1993

[54] CAPLESS VEHICLE REFUELING SYSTEM WITH MOVING FILL PASSAGEWAY

[75] Inventors: Jeffrey Griffin; Robert S. Harris, both of Connersville; J. Bradley Groom, Terre Haute, all of Ind.

[73] Assignee: Stant Manufacturing Inc., Connersville, Ind.

[21] Appl. No.: 901,866

[22] Filed: Jun. 22, 1992

[51] Int. Cl.$^5$ .................. B65B 31/00; B65B 1/04
[52] U.S. Cl. ..................... 141/59; 141/302; 141/351; 220/86.2
[58] Field of Search .............. 141/44, 45, 46, 59, 141/291, 292, 293, 294, 295, 296, 301, 302, 305, 347, 348, 349, 350; 220/86.2; 137/587, 289, 588; 55/88, 387

[56] References Cited

U.S. PATENT DOCUMENTS

| | | | |
|---|---|---|---|
| 3,289,711 | 12/1966 | Hall | 141/286 |
| 3,477,611 | 11/1969 | Niles | 220/86 |
| 3,478,922 | 11/1969 | Mole | 220/86.2 |
| 3,543,484 | 12/1970 | Davis | 55/387 |
| 3,643,690 | 2/1972 | Sarai | 220/86 |
| 3,748,829 | 7/1973 | Joyce et al. | 55/74 |
| 3,763,901 | 10/1973 | Viland | 141/8 |
| 3,884,204 | 5/1975 | Krautwurst et al. | 123/136 |
| 3,907,153 | 9/1975 | Mutty | 220/86 R |
| 3,911,977 | 10/1975 | Berger | 141/348 |
| 3,921,412 | 11/1975 | Heath et al. | 62/54 |
| 3,938,564 | 2/1976 | Jones | 141/352 |
| 4,122,968 | 10/1978 | Germain | 220/86 R |
| 4,142,647 | 3/1979 | Walters | 220/86 R |
| 4,232,715 | 11/1980 | Pyle | 141/1 |
| 4,312,649 | 1/1982 | Fujii et al. | 55/387 |
| 4,420,392 | 12/1983 | Harris | 210/86 |
| 4,424,839 | 1/1984 | Otani et al. | 141/348 |
| 4,441,533 | 4/1984 | Snyder et al. | 141/59 |
| 4,630,749 | 12/1986 | Armstrong et al. | 220/86 R |
| 4,651,889 | 3/1987 | Uranishi et al. | 220/85 VR |
| 4,694,847 | 9/1987 | Szlaga | 137/39 |
| 4,699,638 | 10/1987 | Harris | 55/168 |
| 4,701,198 | 10/1987 | Uranishi et al. | 53/4 |
| 4,702,386 | 10/1987 | Boehmer et al. | 220/86 R |
| 4,714,172 | 12/1987 | Morris | 220/86 R |
| 4,722,454 | 2/1988 | Fischer | 220/85 R |
| 4,741,369 | 5/1988 | Dawson | 141/286 |
| 4,747,508 | 5/1988 | Sherwood | 220/86 R |
| 4,765,504 | 8/1988 | Sherwood et al. | 220/86 R |
| 4,770,677 | 9/1988 | Harris | 55/168 |
| 4,809,863 | 7/1989 | Woodcock et al. | 220/85 F |
| 4,816,045 | 3/1989 | Szlaga et al. | 55/168 |
| 4,826,511 | 5/1989 | Harris | 55/88 |
| 4,836,835 | 6/1989 | Harris et al. | 55/168 |
| 4,877,146 | 10/1989 | Harris | 220/86 VR |
| 4,883,103 | 11/1989 | Szlaga et al. | 141/368 |
| 4,977,936 | 12/1990 | Thompson et al. | 220/86.2 |
| 5,027,868 | 7/1991 | Morris et al. | 220/86.2 |
| 5,056,570 | 10/1991 | Harris et al. | 141/59 |

Primary Examiner—Henry J. Recla
Assistant Examiner—Steven O. Douglas
Attorney, Agent, or Firm—Barnes & Thornburg

[57] ABSTRACT

A filler neck includes an internal tube that is movable to open and close the filler neck. The movable tube is formed to include a fill passageway that extends therethrough and is configured to deliver fuel from a fuel-dispensing nozzle to a vehicle fuel tank when the filler neck is open. The "moving" fill passageway is closed when the filler neck is closed and opened when the filler neck is opened. An inlet opening into the moving fill passageway is formed in an outer end of the movable tube and an outlet opening for discharging liquid fuel from the moving fill passageway for delivery to the fuel tank is formed in an inner end of the movable tube. A fill passageway closure member is appended to a filler neck conduit and positioned to lie in a filler neck vent passageway in spaced-apart relation to the mouth of the conduit. The movable tube is positioned in the conduit for movement in the vent passageway to cause the fill passageway to engage or disengage the fill passageway closure member so as to control opening and closing of the filler neck during the after refueling.

55 Claims, 4 Drawing Sheets

CAPLESS VEHICLE REFUELING SYSTEM WITH MOVING FILL PASSAGEWAY

BACKGROUND AND SUMMARY OF THE INVENTION

The present invention relates to an assembly for controlling the filling of a vehicle fuel tank having a filler neck, and particularly to a filler neck without a removable outer fuel cap. More particularly, the present invention relates to a capless filler neck having an internal opening and closing mechanism and a liquid fuel and fuel vapor handling system which controls the discharge of fuel vapors from the tank and the filler neck both during and after the filling operation.

A removable fuel cap with a sealing gasket typically is used to close the open end of a fuel tank filler neck. Once the fuel cap is removed from the filler neck, the fuel tank is filled, and the fuel-dispensing nozzle is withdrawn from the filler neck, the fuel cap is reattached to the filler neck so that the sealing gasket forms a seal between the fuel cap and the filler neck. Thus, the fuel cap closes the open end of the filler neck to block discharge of liquid fuel and fuel vapor from the fuel tank through the filler neck. It is known, however, to place pressure-relief and vacuum-relief valves in fuel caps to permit some controlled venting of fuel vapors in the filler neck while the fuel cap is mounted on the filler neck.

It has been observed that fuel caps are often lost or damaged over time and, as a result, the open end of the filler neck might not be closed and sealed in accordance with the original equipment specifications during operation of the vehicle. Accordingly, a filler neck configured to "open" automatically as a fuel-dispensing pump nozzle is inserted into the filler neck during refueling and "close" automatically once the attendant withdraws the pump nozzle from the filler neck without requiring the attendant to reattach a fuel cap to the filler neck would be an improvement over many conventional capped filler neck systems. Although conventional fuel caps function to close filler necks in a satisfactory manner, it is thought that a capless filler neck could make vehicle refueling more convenient for the consumer because no action other than inserting a pump nozzle into the open end of the filler neck would be required to begin refueling a vehicle. Advantageously, such a capless filler neck system would be configured in accordance with the present invention to include internal liquid fuel and fuel vapor control means.

Filler necks with self-closing mechanisms are known. A capless vehicle refueling system including a closure member that is movable by a fuel-dispensing nozzle to open a filler neck is disclosed in U.S. Pat. No. 5,056,570 to Harris and Griffin. A quick-release fuel coupling for racing cars is disclosed in U.S. Pat. No. 3,938,564 to Jones.

A capless filler neck that is configured to control air and liquid flow into and out of the filler neck yet is assembled quickly and easily using only a few parts would be an improvement over known filler necks. There is a demand in the industry for an inexpensive yet effective capless filler neck that is reliable and easy to manufacture. An improved filler neck that does not require the use of a conventional fuel cap and that is configured to open automatically both during refueling to permit fuel dispensed by a fuel nozzle to flow into a fuel tank through the filler neck and after refueling to relieve unwanted excess pressure and vacuum conditions in the tank would be welcomed by many vehicle manufacturers.

According to the present invention, a filler neck is provided with an internal tube that is movable to open and close the filler neck. The movable tube is formed to include a fill passageway that extends therethrough and is configured to deliver fuel from a fuel-dispensing nozzle to a vehicle fuel tank when the filler neck is open. The "moving" fill passageway is closed when the filler neck is closed and opened when the filler neck is opened. An inlet opening into the moving fill passageway is formed in an outer end of the movable tube and an outlet opening for discharging liquid fuel from the moving fill passageway for delivery to the fuel tank is formed in an inner end of the movable tube.

The filler neck includes a conduit providing a vent passageway extending therethrough. The conduit includes an outer end formed to include a mouth and an inner end connected to the fuel tank. The vent passageway extends through the conduit between the inner and outer ends. A fill passageway closure member is appended to the conduit and positioned to lie in the vent passageway in spaced-apart relation to the mouth of the conduit.

The movable tube is positioned in the conduit for movement in the vent passageway to cause the fill passageway to engage or disengage the fill passageway closure member so as to control opening and closing of the filler neck during and after refueling. Thus, the tube is movable in the vent passageway to either a filler neck-closing position wherein the fill passageway is blocked by the closure member or a filler neck-opening position wherein the fill passageway is not blocked by the closure member.

The filler neck also includes spring means for yieldably urging the movable tube in the vent passageway toward the mouth of the conduit and into engagement with the closure member that is fixed in spaced-apart relation from the mouth of the conduit. This engagement causes the fixed closure member to close the outlet opening in the movable tube so that flow of liquid fuel and fuel vapor through the fill passageway formed in the movable tube is blocked. At the same time, the spring means yieldably urges the movable tube into engagement with a valve seat portion of the conduit that is closer to the mouth of the conduit to block flow of liquid fuel and fuel vapor through the vent passageway. Thus, the spring means functions simultaneously to bias the movable tube against both the closure member and the valve seat portion of the conduit to establish a filler neck-closing position of the movable tube inside the conduit.

Preferably, in use, a fuel-dispensing nozzle is inserted by a user through the filler neck conduit and into the fill passageway provided in the movable tube. By manually pushing the nozzle further into the conduit and against the spring-loaded movable tube, the tube can be moved against the spring means so that the tube disengages the fixed closure member to open the fill passageway and also disengages the valve seat portion of the conduit to open the larger vent passageway containing the movable tube. Opening the fill passageway in the movable tube allows liquid fuel to be discharged from the nozzle into the fuel tank through the movable tube. Opening the vent passageway in the conduit allows displaced fuel vapor in the fuel tank to escape to the atmosphere through the filler neck.

In preferred embodiments, the conduit includes a partition formed to include a central aperture. The partition is arranged in the conduit to divide the vent passageway into an outer chamber accessible through the mouth of the conduit and an inner chamber connected to the outer chamber through the aperture. The inner chamber is also connected to the fuel tank through a pipe. Preferably, the valve seat portion mentioned above is provided by a portion of the partition surrounding the central aperture and lying in the inner chamber.

A pair of pressure-relief valves are mounted in the partition next to the central aperture to control venting of excessive fuel vapor pressure from the inner chamber to the outer chamber and atmosphere while the movable tube is in its filler neck-closing position. A vacuum-relief valve is also mounted in the partition next to the central aperture to admit ambient air from the atmosphere outer chamber into the inner chamber and then the fuel tank as soon as vacuum conditions develop in the inner chamber or the fuel tank. Also, a drain passageway is provided in the partition next to the central aperture to drain any liquid such as rain water or the like that happens to collect in the outer chamber to a drainage outlet formed in the conduit so that such unwanted liquid is drained from the filler neck and unable to contaminate the fuel tank.

The fill passageway closure member mounted in the conduit is a tubular member that includes a distal end shaped to provide a plug for closing the fuel-discharging outlet opening of the fill passageway in the movable tube. The closure member also includes a base that is attached to a support frame mounted in the inner chamber of the vent passageway. The support frame includes a fuel transfer conduit extending through the inner chamber for conducting liquid fuel from the fill passageway in the movable tube into the pipe coupled to the fuel tank whenever the movable tube is in its filler neck passageway-opening position and liquid fuel is being dispensed into the fill passageway by a nozzle during refueling.

The spring means includes a coiled spring that surrounds the movable tube and extends along the length of the movable tube. The spring has one end that engages the support frame and another end that engages an exterior flange appended to the movable tube. A sealing ring is mounted to lie around the movable tube and abut the exterior flange. Normally, the coiled spring will urge the movable tube toward the mouth of the conduit and through the central aperture in the partition so that the sealing ring around the movable tube will engage the valve seat portion of the partition around the central aperture to establish a liquid fuel and fuel vapor seal between the partition and the movable tube.

The movable tube includes an internal flange in the fill passageway that is arranged to be engaged by the tip of a fuel-dispensing nozzle inserted into the inlet opening of the movable tube during refueling. A user can insert the nozzle into the outer chamber of the conduit and on into the fill passageway so that it engages the internal flange and then move the nozzle further into the conduit to urge the movable tube against the spring. This causes the movable tube to move to disengage the fill passageway closure member and thus open the fill passageway and to disengage the sealing ring and the partition so that the vent passageway is opened. Liquid fuel discharged from the nozzle is then able to flow through the fill passageway in the movable tube into the fuel tank. At the same time any pressurized fuel vapor present in the fuel tank and filler neck can escape to the atmosphere through the vent passageway formed in the conduit and the central aperture formed in the partition.

The improved capless filler neck of the present invention is easy to manufacture and assemble. A user can easily move the spring-loaded movable tube manually in the conduit from a filler neck-closing position to a filler neck-opening position by merely inserting a conventional fuel-dispensing nozzle fully into the filler neck. Once the nozzle is removed, the spring automatically returns the movable tube to its filler neck-closing position. Advantageously, the filler neck is provided with a partition having a pressure-relief valve, a vacuum-relief valve, and a drainage means to control inflow of air and liquid into the capless filler neck and outflow of pressurized fuel vapor out of the capless filler neck during and after refueling.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
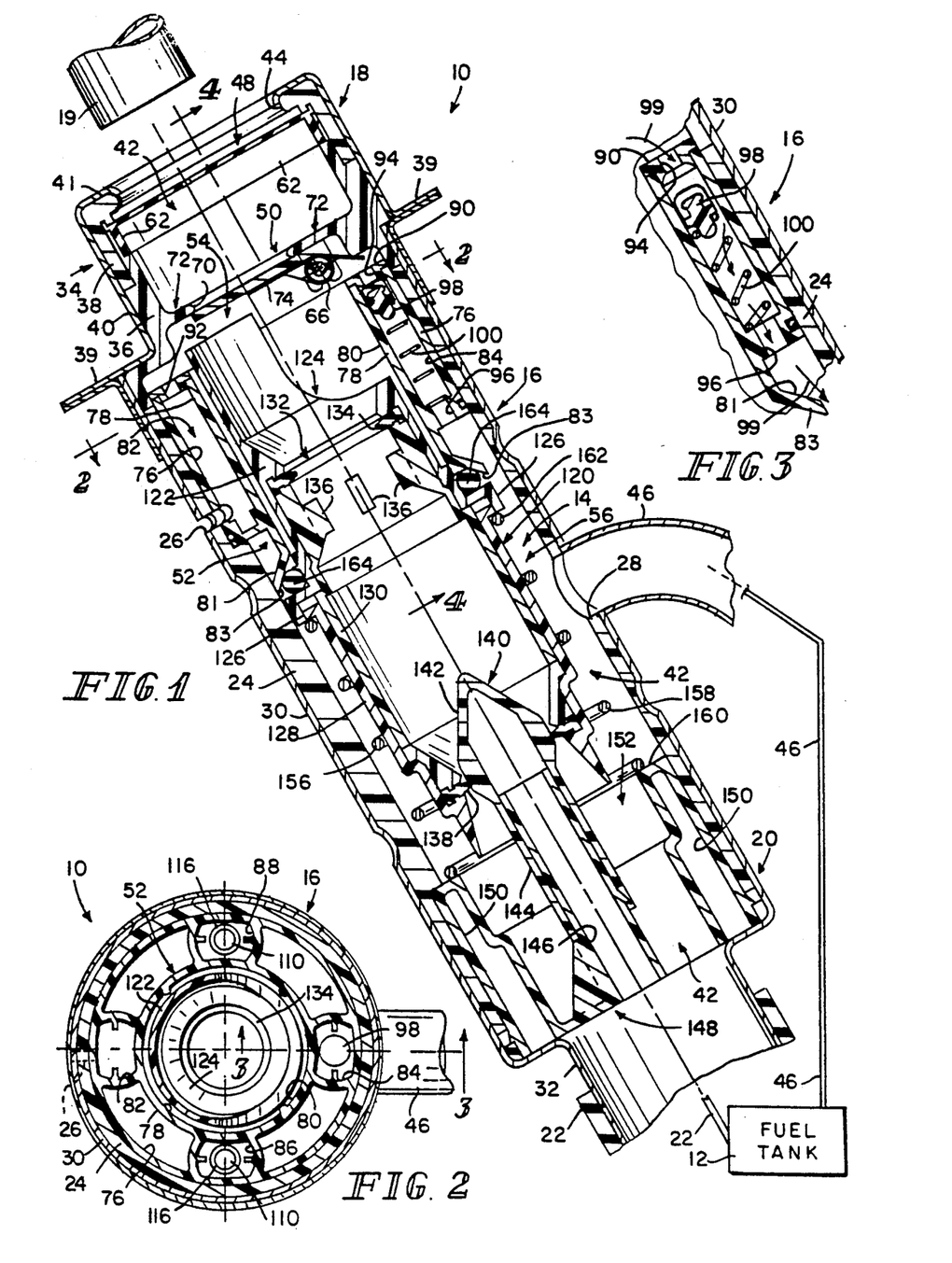
FIG. 1 is a transverse sectional view of a filler neck in accordance with the present invention showing an appearance cover, a pivotable fuel splash door, a partition including a drain passageway and a vacuum-relief valve, a movable tube including a central fill passageway, a closure member, a spring urging the movable tube into engagement with the partition and the closure member to close the filler neck, and a fuel tank connected to the filler neck.
FIG. 2 is a sectional view taken along lines 2—2 of FIG. 1 showing the arrangement of the drain passageway, two pressure-relief valves, and a vacuum-relief valve in the partition and around a central aperture formed in the partition.
FIG. 3 is a sectional view taken along lines 3—3 of FIG. 2 showing the vacuum-relief valve.

The filler neck 10 of the present invention is shown in section in FIG. 1 and is used to deliver liquid fuel to a fuel tank 12. The filler neck 10 also includes an internal nozzle-actuated opening and closing mechanism 14 which eliminates the need for a conventional external filler neck closure cap. The filler neck 10 also functions to vent pressurized fuel vapor from the fuel tank 12 whenever the pressure extant in the fuel tank 12 exceeds a predetermined positive pressure as may occur on a hot day. Outside air is admitted into the fuel tank 12 through filler neck 10 whenever the pressure extant in the fuel tank 12 exceeds a predetermined negative pressure to relieve vacuum conditions that may develop in the fuel tank during a cool evening or the like.

The filler neck 10 includes a multiple-piece conduit 16 having an outer end 18 that is arranged to receive a fuel-dispensing nozzle 19 during refueling and an inner end 20 that is coupled to a filler pipe 22 that conducts liquid fuel and fuel vapor between conduit 16 and fuel tank 12. The conduit 16 includes a plastic vent housing 24 formed to include a side drain outlet 26 and a side vent opening 28, and a thin-walled metal sleeve 30 surrounding the vent housing 24 and having an inner necked-down portion 32 coupled to the filler pipe 22. The metal sleeve 30 is formed to include an outlet opening for drain outlet 26 as shown in FIGS. 1 and 2.

The conduit 16 also includes an external portion 34 having a hollow base 36 mounted on the outer end of vent housing 24, a collar 38 mounted on the outer end of base 36, and a thin-walled metal sleeve 40 around the base 37 and collar 38. Metal sleeve 40 includes an annular, radially outwardly extending mounting flange 39 and an annular outer lip 41 as shown in FIG. 1.

A vent passageway 42 extends through conduit 16 from an open mouth 44 formed in the collar 38 to the filler pipe 22 connected to fuel tank 12. As shown in FIG. 1, vent passageway 42 extends through collar 38, base 36, vent housing 24, and the necked-down portion 32 of metal sleeve 30 to reach the filler pipe 22 that is connected to fuel tank 12. A tank venting tube 46 lies outside conduit 16 and connects fuel tank 12 with a portion 56 of the vent passageway 42 formed in the vent housing 24. The vent housing 24 and metal sleeve 30 are formed to include the vent opening 28 to allow fuel vapor extant in fuel tank 12 to vent to the atmosphere through tank venting tube 46 and vent passageway 42 during refueling.

Figure 5:
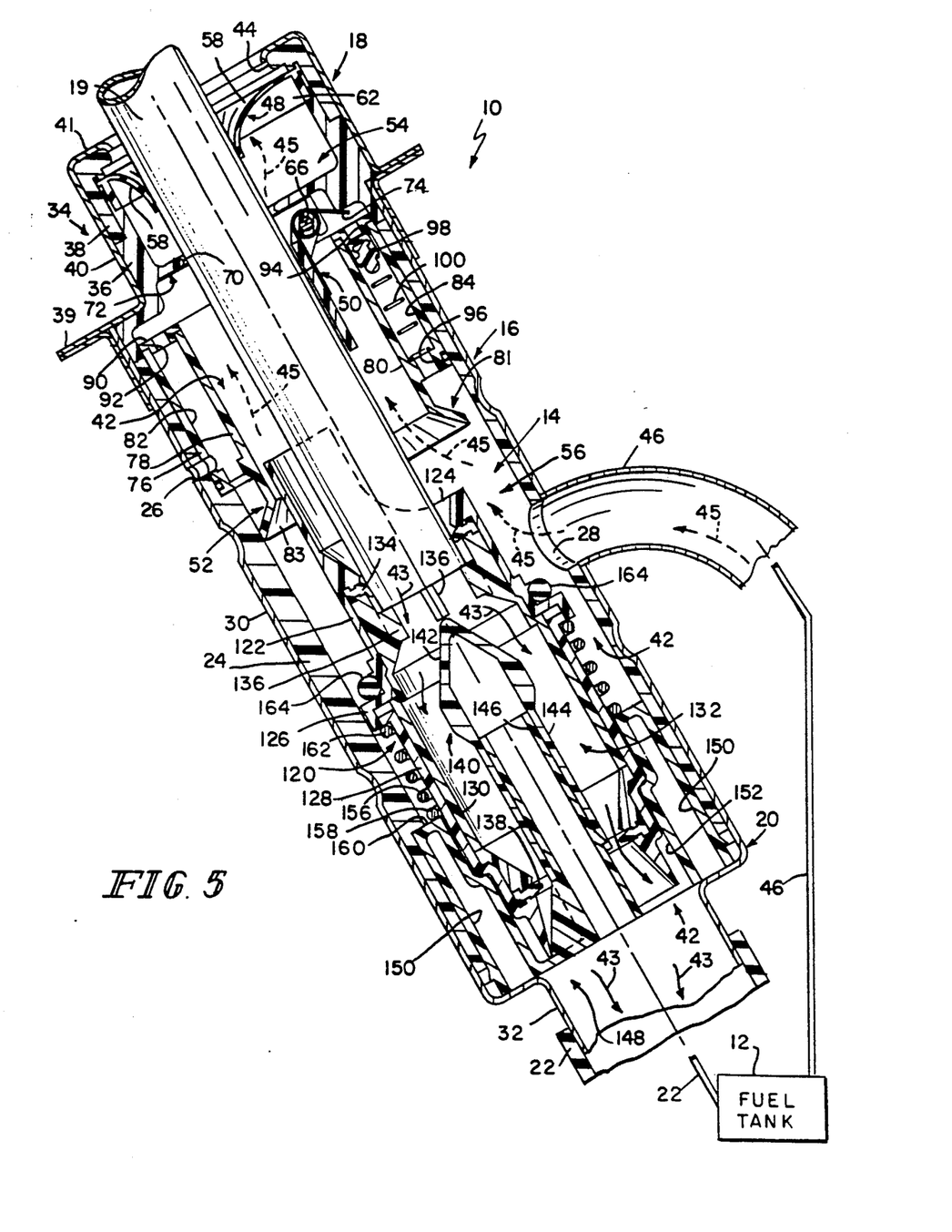
FIG. 5 is a view of the filler neck of FIG. 1 during use of a fuel-dispensing nozzle to introduce liquid fuel into the filler neck for delivery to the fuel tank and showing venting of displaced fuel vapor from the fuel tank through the central aperture in the partition and around the movable tube as liquid fuel is being discharged into the filler neck.

During refueling a user can insert a fuel-dispensing nozzle 19 into the vent passageway 42 in the manner shown in FIG. 5 to dispense liquid fuel 43 into the fuel tank 12 through conduit 16. At the same time, fuel vapor 45 displaced by liquid fuel 43 is able to vent from the fuel tank 12 to the atmosphere through both the filler pipe 22 and tank venting tube 46 to the vent passageway 42 and the open mouth 44 in conduit 16. Movement of the fuel-dispensing nozzle 19 in the vent passageway 42 actuates the filler neck opening and closing mechanism 14 that is mounted in the vent passageway 42 so that it is not necessary to use a conventional removable fuel cap (not shown) to close the open mouth 44 of filler neck 10. As shown in FIG. 1, the nozzle-actuated filler neck opening and closing mechanism 14 is mounted in an outer portion of the vent housing 24 near the external portion 34 of the conduit 16 so that it is accessible by a nozzle 19 inserted into the conduit 16.

After refueling, some flow of fuel vapor and atmospheric air is permitted through filler neck 10 when the filler neck 10 is closed by internal mechanism 14. Pressure-relief valves are provided in vent passageway 42 in the manner described below to control tank venting through filler pipe 22, venting tube 46, and vent passageway 42 when the filler neck 10 is closed by the opening and closing mechanism 14 at all times other than refueling. A vacuum-relief valve is also provided in vent passageway 42 to allow some air from the atmosphere to enter fuel tank 12 through vent passageway 42, tank venting tube 46, and filler pipe 22 when the filler neck 10 is nominally closed by opening and closing mechanism 14. These pressure-relief and vacuum-relief valves are illustrated, for example, in FIGS. 1 and 4, and will be described in greater detail below.

As shown in FIGS. 1 and 2, the filler neck 10 includes an appearance cover 48 and a normally closed closure door 50 leading into that portion of the vent passageway 42 formed in vent housing 24. Filler neck 10 also includes a partition 52 mounted in vent housing 24 to divide the vent passageway 42 into an outer chamber 54 communicating with the atmosphere through the loose appearance cover 48 and the open mouth 44 and an inner chamber 56 communicating with the fuel tank 12 through filler pipe 22 and tank venting tube 46.

Figures 4, 6:
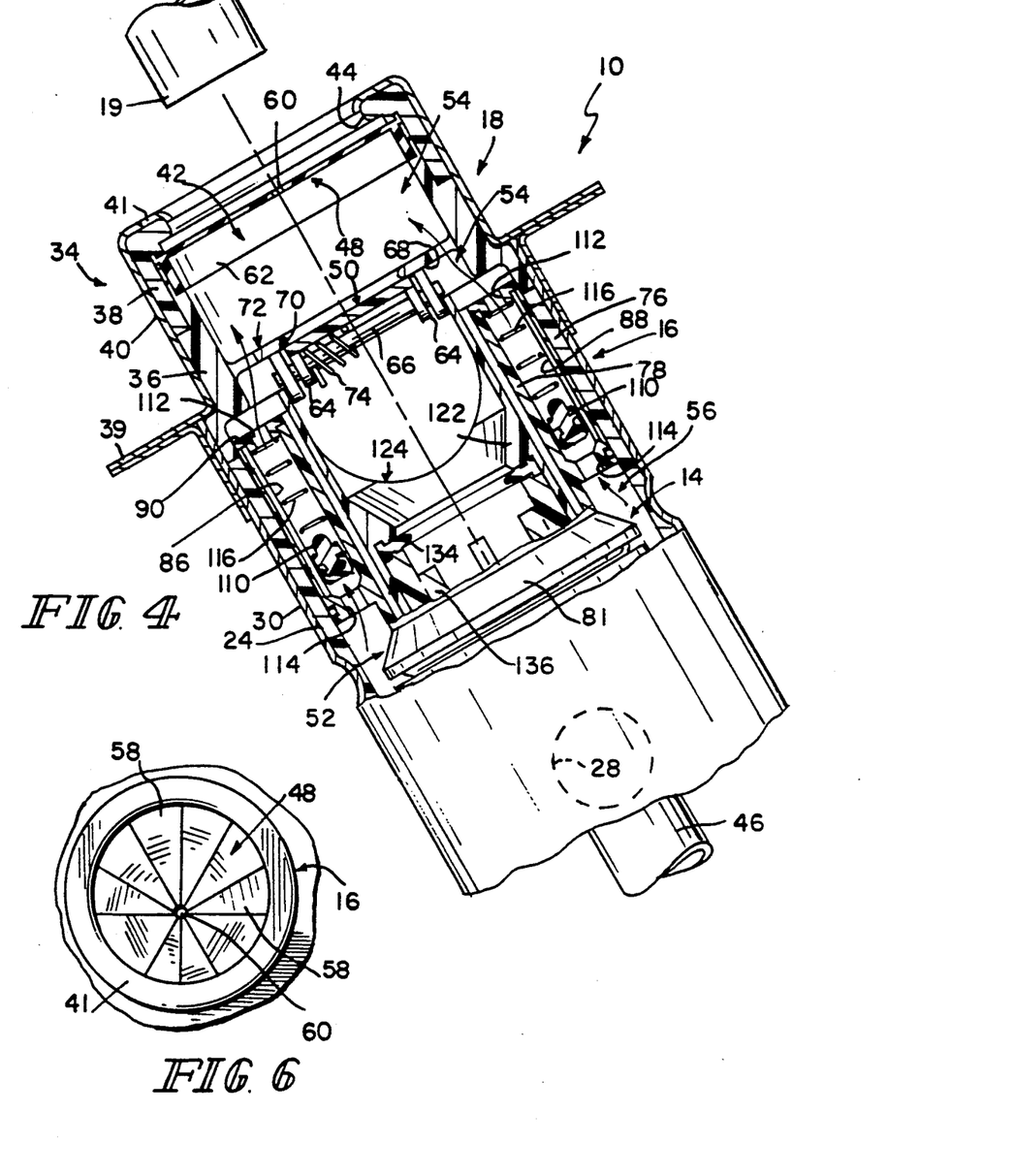
FIG. 4 is a sectional view taken along lines 4—4 of FIG. 1 showing the pivotable spring-loaded fuel splash door, the two pressure-relief valves, and a contoured nozzle guide on the axially outer end of the movable tube providing an entrance into the fill passageway formed in the movable tube.
FIG. 6 is a plan view of the exposed part of the filler neck illustrating the appearance cover on the outer end of the filler neck.

Appearance cover 48 is provided to give the outward appearance that the filler neck 10 is closed to provide comfort to consumers unable to see the internal valve mechanism 14 provided inside the conduit 16 and is best shown in FIG. 6. Appearance cover 48 includes a plurality of pie-shaped sections 58 defining a central opening 60 that is not aligned with the center of conduit 16. Appearance cover 48 also includes an annular rim 62 at a perimeter edge that is trapped between the collar 38 and base 36 as shown best in FIGS. 1 and 4 to hold the appearance cover 48 in place in external portion 34 of conduit 16.

Closure door 50 is coupled to a pivot arm 64. Pivot arm 64 is pivotably movable about a pivot shaft 66 to move closure door 50 from its normally closed position against an annular valve seat 68 to its open position. The annular valve seat 68 lies around a nozzle restrictor aperture 70 formed in a transverse wall 72 included in the base 36 as shown in FIG. 1. A torsion spring 74 around pivot shaft 66 biases pivot arm 64 to maintain closure door 50 in its normally closed position covering aperture 70 as shown in FIGS. 1 and 4. Upon insertion of fuel nozzle 17 into conduit 16 through the open mouth 44, segmented appearance cover 48, and nozzle restrictor aperture 70, closure door 50 pivots to its open position opening aperture 70 illustrated in FIG. 5.

As shown in FIGS. 1 and 2, partition 52 includes a cylindrical radially outer sleeve 76 mounted in a cylindrical groove formed in vent housing 24. Partition 52 also includes a cylindrical radially inner sleeve 78 defining an aperture 80 for receiving nozzle 19 therein and terminating in a flared rim 81 providing an axially inwardly facing annular valve seat 83 around the nozzle-receiving aperture 80. As shown best in FIG. 2, the partition 52 is formed to include a drain passageway 82, an ambient air intake passageway 84, and a pair of fuel vapor vent passageways 86, 88 extending in an axial direction through vent housing 24 and interconnecting outer chamber 54 to inner chamber 56. The passageways 82, 84, 86, and 88 are arranged in circumferentially and uniformly spaced-apart relation in the annular space between the outer sleeve 76 and inner sleeve 78 as shown best in FIG. 2 to lie in a ring about the central nozzle-receiving aperture 80.

As shown in FIG. 1, a top annular partition plate 90 is attached to the axially outer annular edges of outer sleeve 76 and inner sleeve 78. The plate 90 is formed to include a drain inlet 92 into the drain passageway 82. By mounting the filler neck 10 at an angle so that the drain passageway 92 is close to the underlying street, any unwanted liquid such as rain water or the like that seeps into the outer chamber through mouth 44 and aperture 70 will collect and pass through drain inlet 92 into drain passageway 82. The unwanted liquid will then pass through drain passageway 82 for discharge from the filler neck 10 through the drain outlet 26 formed in outer sleeve 76, vent housing 24, and metal sleeve 30. Such a drainage system functions to minimize the volume of liquid that might inadvertently flow through the conduit 16 to filler pipe 22 and reach the fuel tank 12.

An air inlet 94 is formed in an opposite side of annular partition plate 90 to allow ambient air in outer chamber 54 to flow into the ambient air intake passageway 84 formed in partition 52. An ambient air outlet 96 is formed at the other end of intake passageway 84 to discharge air from the intake passageway 84 into the inner chamber 56. A vacuum-relief valve 98 is located in intake passageway 84 and biased to a normally closed position closing air inlet 94 by spring 100, as shown in FIG. 1. If negative pressure (vacuum) above a predetermined level occurs within fuel tank 12 and inner chamber 56, vacuum-relief valve 98 moves to the opened position shown in FIG. 3 to admit ambient air 99 extant in the outer chamber 54 into the inner chamber 56 through the ambient air intake passageway 84. This occurs only when a sufficient vacuum develops in fuel tank 12 and the vacuum is applied to the inner chamber 56 by one or both of filler pipe 22 and tank venting tube 46.

A pair of pressure-relief valves 110 are provided for controlling flow of pressurized fuel vapor through the fuel vapor vent passageways 86, 88 as shown in FIGS. 2 and 4. Each passageway 86, 88 includes a fuel vapor outlet 112 formed in the annular partition plate 90 and a fuel vapor inlet 114 formed at an opposite end of the passageway 86, 88 as shown best in FIG. 4. Each pressure-relief valve 110 is biased to a normally closed position closing fuel vapor inlet 114 by spring 116. As pressure inside fuel tank 12 increases, pressure within the inner chamber 56 also increases because of the fluid connection to fuel tank 12 through tank venting tube 46. If pressure in inner chamber 56 increases above a predetermined level, each pressure-relief valve 110 moves upwardly to a position shown, for example, in FIG. 4. This permits pressurized fuel vapor 45 to vent from fuel tank 12 to the atmosphere through tank venting tube 46, inner chamber 56, fuel vapor vent passageways 86, 88, outer chamber 54, and conduit mouth 44.

Referring again to FIGS. 1 and 5, it will be apparent that the opening and closing mechanism 14 includes a movable tube 120 that is arranged in the inner chamber 56 and configured to provide a slide valve that is movable from a filler neck-closing position shown in FIG. 1 to a filler neck-opening position shown in FIG. 5 by engagement with a moving fuel-dispensing nozzle 19 during refueling. The multi-piece movable tube 120 includes an upper tube 122 having a nozzle guide 124 and an annular flange 126, a lower tube 128 connecting to the upper tube 122 at the annular flange 126, and an interior sleeve 130 extending through the upper and lower tubes 122, 128 as shown in FIG. 1 to define a fill passageway 132 extending through the movable tube 120. Advantageously, this moving fill passageway 132 conducts liquid fuel dispensed from nozzle 19 through conduit 16 toward the fuel tank 12 and moves with the movable tube 120 as it travels between its filler neck-closing and filler neck-opening positions.

An annular nozzle seal 134 is mounted in an inlet opening in fill passageway 132 near the outer end of movable tube 120 to engage the outer periphery of the fuel-dispensing nozzle 19 and provide a seal upon insertion of the nozzle 19 into the fill passageway 132 during refueling. A nozzle-engaging means is provided by a series of circumferentially spaced-apart axially extending abutments 136 formed in fill passageway 132 near the outer end of the interior sleeve 130. In use, nozzle 19 can be pushed against these abutments 136 to urge the movable tube 120 against a spring toward a filler neck-opening position as shown in FIG. 5. Another annular seal 138 is mounted in an outlet opening in fill passageway 132 near the inner end of movable tube 120 to engage a fill passageway closure member 140 mounted in the inner chamber 56 and establish a seal between movable tube 120 and closure member 140.

The fill passageway closure member 140 includes a conical valve guide 142 and a cylindrical shaft 144 that is attached to a central rod 146 supported in the inner chamber 56 by a closure member support frame 148 as shown best in FIG. 1. The support frame 148 includes a cylindrical mounting sleeve 150 attached to an inner wall of vent housing 24 near the necked-down portion 32 of sleeve 30. The support frame 148 is also formed to include at least one fuel transfer conduit 152 for conducting liquid fuel 43 discharged through the outlet opening in the fill passageway 132 of movable tube 120 into the inner chamber 56 as shown in FIG. 5 so that such liquid fuel 43 can flow through filler pipe 22 into fuel tank 12.

A coiled compression spring 156 is positioned in inner chamber 56 of vent housing 24 to surround movable tube 120 as shown best in FIG. 1. Spring 156 has an inner end 158 that acts against an annular spring support wall 160 formed on support frame 148. Spring 156 also includes an outer end 162 that acts against the annular flange 126 provided on movable tube 120. Spring 156 is configured to yieldably urge the movable tube 120 to the filler neck-closing position shown in FIG. 1. In this position, a sealing ring 164 surrounding movable tube 120 and resting on annular flange 126 is loaded against the flared annular valve seat 83 to establish a sealed connection between partition 52 and movable tube 120 so that flow of liquid and vapor around the outside of movable tube 120 and through the central aperture 80 formed in partition 52 is blocked. Also in this position, the annular seal 138 mounted in fill passageway 132 is placed into engagement with the fill passageway closure member 140 to block the flow of liquid and vapor between the inner and outer chambers 54, 56 through the movable tube 120. Reference is hereby made to U.S. Pat. No. 4,977,936 entitled "Filler Neck Sealing Assembly" for a description of an annular seal member of the tube suitable for use to provide annular sealing rings 134 and 138.

In use, a nozzle 19 is moved near the mouth 44 of filler neck conduit 16 as shown in FIG. 1 and pushed inwardly into vent passageway 42 by piercing through the sectional appearance cover 48, passing through nozzle restrictor aperture 70, and pivoting the spring-loaded closure door 50 out of the way as shown in FIG. 5. The outer end of the nozzle guide 124 is located in the central aperture 80 of partition 52 to receive the nozzle 19 once it passes beyond the pivoted closure door 50. The nozzle guide 125 includes a contoured conical camming ramp 166 that is arranged to guide the inwardly moving nozzle 19 through the aperture defined by the annular nozzle seal 134 and toward the nozzle-engaging abutments 136 appended to an inner wall of movable tube 120 to lie inside fill passageway 132.

By continuing to push the nozzle 19 further into the filler neck 10, a user is able to move the movable tube 120 against spring 156 from its filler neck-closing position shown in FIG. 1 to its filler neck-opening position shown in FIG. 5. This movement disengages the annular seal 138 on movable tube 120 and the fill passageway closure member 140 to permit liquid fuel 43 dispensed from nozzle 19 to flow to fuel tank 12 through fill passageway 132, fuel transfer conduit 152, necked-down portion 32 of metal sleeve 30, and filler pipe 22. At the same time, the sealing ring 164 around movable tube 120 disengages the annular valve seat 83 on partition 52 to "open" the central aperture 80 therein so that pressurized fuel vapor 45 extant in inner chamber 56 is vented through aperture 88 into the outer chamber 54 and then the atmosphere. Once refueling of fuel tank 12 has been completed, the nozzle 19 is withdrawn from filler neck 10 and the spring 156 automatically returns movable tube 120 to its filler neck-closing position shown in FIG. 1.

Figures 7, 8:
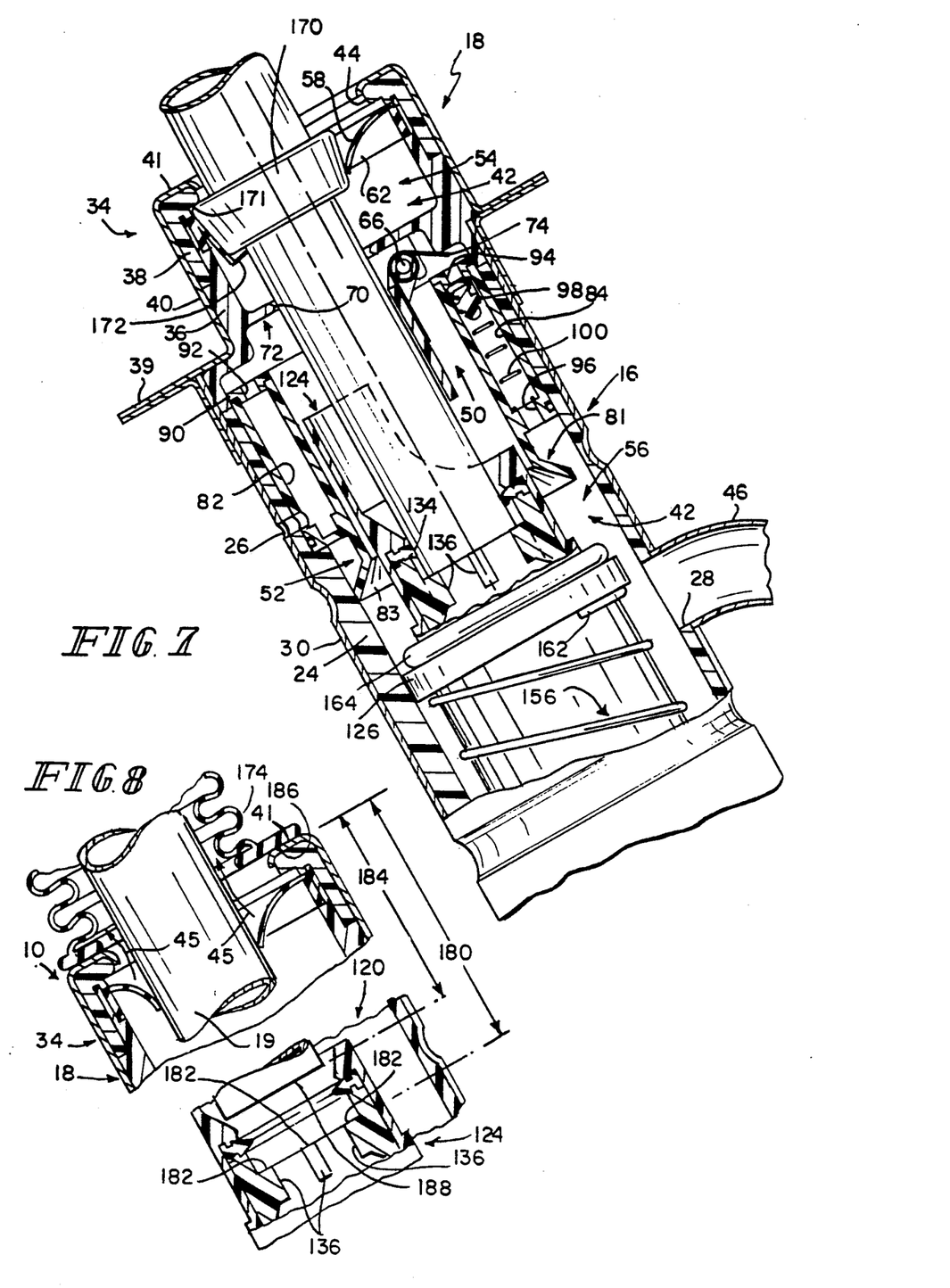
FIG. 7 is a view of an alternative embodiment of a filler neck.
FIG. 8 is a view of a fuel-dispensing nozzle outfitted with an external fuel vapor recovery boot mounted on a filler neck of the type shown in FIG. 1 to capture fuel vapor discharged from the filler neck in the fuel vapor recovery boot.

Another embodiment of a filler neck in accordance with the present invention is shown in FIG. 7. In this embodiment, the fuel-dispensing nozzle 19 includes an annular collar 170 that is trapped between a lip 171 on annular rim 41 and a latch 172 mounted in the external portion 34 to hold the nozzle 19 in the fuel-dispensing position shown in FIG. 7. Advantageously, this self-latching feature helps to hold the fuel-dispensing nozzle 19 in place in the filler neck 10 during vehicle refueling without requiring the user to hold the nozzle 19 manually in place.

In some parts of the United States, such as California, it is customary to outfit each fuel-dispensing nozzle with a cylindrically shaped fuel vapor recovery boot. Advantageously, as shown in FIG. 8, the annular lip 41 on the external portion 34 of filler neck 10 is sized and shaped to engage a fuel vapor recovery boot 174 during insertion of a nozzle outfitted with such a boot 174 into the filler neck. Annular lip 41 thus cooperates with boot 174 to establish a well-sealed connection between boot 174 and the filler neck so that any fuel vapor discharged through the mouth 44 of the filler neck will be passed into the boot 174 where it can be recovered using conventional fuel vapor recovery techniques.

As shown in FIG. 8, the distance 180 between the annular lip 41 of filler neck 10 and the nozzle-engaging surfaces 182 of the abutments 136 formed on nozzle guide 124 (when the movable tube 120 is in its filler neck-closing position) is designed to be greater than the distance 184 between the outer face 186 of the boot 174 and the outer end 188 of the fuel-dispensing nozzle 19. This ensures that the boot 174 is seated properly on the filler neck 19 before the nozzle 19 moves the movable tube 120 inwardly to break the seal and open the filler neck 10. Therefore, any residual tank pressure (e.g., "puff loss") is captured in the boot 174 rather than being lost to the atmosphere.

Although the invention has been described in detail with reference to preferred embodiments, variations and modifications exist within the scope and spirit of the invention as described and defined in the following claims.

We claim:

1. A filler neck for use in delivering fuel to a vehicle fuel tank, the filler neck comprising
   a conduit including an outer end formed to include a mouth, an inner end formed to include means for delivering fuel to a fuel tank, and a vent passageway extending between the mouth and the delivering means,
   a tube positioned for movement in the vent passageway and formed to include a fill passageway extending therethrough, the tube includes an outer end formed to include an inlet opening into the fill passageway and an inner end formed to include an outlet opening out of the fill passageway,
   a closure member appended to the conduit and positioned to lie in the vent passageway, and
   spring means for yieldably urging the tube in the vent passageway toward the mouth of the conduit and into engagement with the closure member to close the outlet opening in the tube to block flow of liquid fuel and fuel vapor through the fill passageway formed in the tube and with the conduit to block flow of liquid fuel and fuel vapor through the vent passageway formed in the conduit so that a filler neck-closing position of the tube is established.

2. The filler neck of claim 1, wherein the conduit further includes a partition dividing the vent passageway into an outer chamber communicable with the atmosphere through the mouth and an inner chamber communicating with the delivering means, the partition is formed to include an aperture connecting the inner and outer chambers in fluid communication, and the spring means is arranged in the inner chamber normally to urge the tube into engagement with the partition to block flow of liquid fuel and fuel vapor through the vent passageway.

3. The filler neck of claim 2, wherein the tube is arranged in the vent passageway to extend through the aperture formed in the partition and position the inlet opening in the outer end of the tube in the outer chamber of the vent passageway.

4. The filler neck of claim 3, wherein the tube includes means for allowing a moving fuel-dispensing nozzle entering the outer chamber and the inlet opening to move the tube in the vent passageway against the spring means to disengage the partition and closure member so that the aperture and fill passageway are opened to allow fuel to pass into the delivering means.

5. The filler neck of claim 3, wherein the tube includes an interior flange mounted to lie in the fill passageway and arranged to engage a fuel-dispensing nozzle inserted into the fill passageway through the inlet opening formed in the outer end of the tube.

6. The filler neck of claim 2, wherein the tube further includes seal means for sealingly engaging a portion of the partition around the aperture to establish a fuel vapor seal therebetween upon movement of the tube into engagement with the partition by the spring means.

7. The filler neck of claim 6, wherein the seal means is a sealing ring coupled to an exterior wall of the tube and arranged to remain in the inner chamber of the vent passageway during movement of the tube in the vent passageway.

8. The filler neck of claim 6, wherein the tube further includes an exterior wall and an exterior flange appended to the exterior wall, the seal means engages the exterior flange, and the spring means engages the exterior flange normally to urge the tube toward the mouth of the conduit to move the seal means into engagement with the partition and the outlet end of the tube into engagement with the closure member.

9. The filler neck of claim 2, wherein the partition includes pressure-relief means for venting fuel vapor in the inner chamber to the outer chamber when the tube engages the partition and the closure member to block flow of fuel vapor through the aperture and the pressure of fuel vapor in the inner chamber exceeds a predetermined positive pressure so that pressurized fuel vapor is vented from the fuel tank to the atmosphere through the conduit.

10. The filler neck of claim 2, wherein the partition includes vacuum-relief means for admitting ambient air extant in the outer chamber into the inner chamber when the tube engages the partition and the closure member to block the aperture and the pressure in the inner chamber exceeds a predetermined negative pressure so that ambient air is admitted into the fuel tank through the conduit.

11. The filler neck of claim 1, wherein the tube further includes first seal means for sealingly engaging a fuel-dispensing nozzle inserted through the mouth of the conduit into the inlet opening of the tube and second seal means for sealingly engaging the closure member upon movement of the tube in the vent passageway to its filler neck-closing position.

12. The filler neck of claim 11, wherein the first and second seal means are situated in the fill passageway.

13. The filler neck of claim 11, wherein the closure member includes a support frame attached to the conduit and arranged to lie inside the vent passageway and outlet closing means mounted to the support frame and arranged to extend through the outlet opening formed in the inner end of the tube to engage the second seal means when the tube is in its filler neck-closing position.

14. The filler neck of claim 13, wherein the spring means surrounds the tube and includes one end engaging the support frame and another end engaging an exterior flange appended to the tube.

15. The filler neck of claim 11, wherein the conduit further includes a partition dividing the vent passageway into an outer chamber communicable with the atmosphere through the mouth and an inner chamber communicating with the delivering means, the partition is formed to include an aperture connecting the inner and outer chambers in fluid communication, and the tube further includes third seal means for sealingly engaging the partition to establish a fuel vapor seal between the partition and the tube when the tube is in its filler neck-closing position so that the aperture is closed.

16. The filler neck of claim 15, wherein the third seal means is positioned to lie around the tube and outside of the fill passageway extending through the tube.

17. The filler neck of claim 1, wherein the closure member includes a support frame attached to the conduit and arranged to lie inside the vent passageway and outlet closing means mounted to the support frame and arranged to extend into the outlet opening formed in the inner end of the tube when the tube is in its filler neck-closing position.

18. The filler neck of claim 17, wherein the support member is formed to include means for conducting liquid fuel discharged from the outlet opening in the inner end of the tube into the delivering means.

19. A filler neck for use in delivering fuel to a vehicle fuel tank, the filler neck comprising a conduit including an outer end formed to include a mouth, an inner end formed to include means for delivering fuel to a fuel tank, and a vent passageway extending between the mouth and the delivering means, partition means for dividing the vent passageway into an outer chamber communicable with the atmosphere through the mouth and an inner chamber communicating with the delivering means, the partition means including aperture means for admitting a fuel-dispensing nozzle into the inner chamber during refueling, tube means for providing a fill passageway, the tube means being positioned for movement in the vent passageway of the conduit between a fill passageway-opening position and a fill passageway-closing position, the tube means including an outer end formed to include tube inlet means for admitting a fuel-dispensing nozzle into the fill passageway and an inner end formed to include tube outlet means for discharging fuel from the fill passageway into the delivering means, means for closing the fill passageway to block discharge of fuel vapors from the fuel tank to the atmosphere through the fill passageway upon movement of the tube means to its fill passageway-closing position, the closing means being appended to the conduit and arranged to engage the tube outlet means upon arrival of the tube means at its fill passageway-closing position, and spring means for yieldably urging the tube means into engagement with the partition means to block venting of fuel vapors from the inner chamber to the outer chamber through the aperture means formed in the partition means and into engagement with the closing means appended to the conduit to block venting of fuel vapors from the inner chamber to the outer chamber through the fill passageway.

20. The filler neck of claim 19, wherein tube means further includes seal means for sealingly engaging a portion of the partition means around the aperture means to establish a fuel vapor seal between the partition means and the tube means upon movement of the tube means to its fill passageway-closing position by the spring means so that fuel vapor is unable to pass from the inner chamber to the outer chamber through the aperture means.

21. The filler neck of claim 20, wherein the seal means includes a sealing ring coupled to the outer end of the tube means and arranged to face toward the partition means.

22. The filler neck of claim 19, wherein the partition means is formed to include a passageway lying adjacent to the aperture means and interconnecting the inner and outer chambers and the partition means further includes a pressure-relief valve in the passageway.

23. The filler neck of claim 19, wherein the partition means is formed to include a passageway lying adjacent to the aperture means and interconnecting the inner and outer chambers and the partition means further includes a vacuum-relief valve in the passageway.

24. The filler neck of claim 19, wherein the tube means includes a tubular member sized to extend through the aperture means and an exterior flange appended to the tubular member and the spring means engages the exterior flange normally to urge the tubular member through the aperture means to position the tube inlet means in the outer chamber to receive a fuel-dispensing nozzle inserted into the outer chamber through the mouth of the conduit.

25. The filler neck of claim 24, wherein the tube means further includes seal means for sealingly engaging a portion of the partition means around the aperture means to establish a fuel vapor seal between the partition means and the tubular member and the seal means is coupled to the exterior flange of the tubular member.

26. The filler neck of claim 24, wherein the tube inlet means includes an interior flange appended to the tubular member and arranged to lie in the fill passageway to engage a moving fuel-dispensing nozzle inserted into the fill passageway through the tube inlet means to provide means for allowing a moving fuel-dispensing nozzle to move the tube means against the spring means to its fill passageway-opening position.

27. The filler neck of claim 24, wherein the closing means includes a closure member positioned to extend into the fill passageway and configured to close the tube outlet means upon movement of the tube means to its fill passageway-closing position.

28. The filler neck of claim 19, wherein the tube inlet means includes means for engaging a moving fuel-dispensing nozzle inserted into the aperture means to move the tube means against the spring means to the fill passageway-opening position in the vent passageway so that fuel discharged by the fuel-dispensing nozzle into the fill passageway passes through the tube outlet means into the delivering means and fuel vapors extant in the inner chamber vents through the aperture means into the outer chamber.

29. The filler neck of claim 28, wherein the tube outlet means and the spring means are situated in the inner chamber and the tube inlet means further includes a nozzle guide that is situated to extend in an axially outwardly extending direction toward the mouth of the conduit and through the aperture means.

30. The filler neck of claim 29, wherein the tube means further includes nozzle seal means for sealingly engaging a fuel-dispensing nozzle inserted into the tube inlet means and the nozzle seal means is situated in the tube means between the nozzle guide and the engaging means.

31. The filler neck of claim 28, further comprising means for conducting fuel vapors from the fuel tank to the inner chamber to permit fuel vapors in the fuel tank to be discharged into the inner chamber during introduction of fuel into the fuel tank through the fill passageway and delivering means so that the fuel vapors extant in the inner chamber are discharged into the outer chamber through the aperture means upon movement of the tube means by the fuel-dispensing nozzle to its fill passageway-opening position in the vent passageway.

32. The filler neck of claim 19, wherein the partition means includes pressure-relief means for venting fuel vapor in the inner chamber to the outer chamber when the tube means is in its fill passageway-closing position and the pressure of fuel vapor in the inner chamber exceeds a predetermined positive pressure so that pressurized fuel vapor is vented from the fuel tank to the atmosphere through the conduit.

33. The filler neck of claim 19, wherein the partition means includes vacuum-relief means for admitting ambient air extant in the outer chamber into the inner chamber when the tube means is in its fill-passageway closing position and the pressure in the inner chamber exceeds a predetermined negative pressure so that ambient air is admitted into the fuel tank through the conduit.

34. The filler neck of claim 19, wherein the partition means further includes means for draining liquid collecting in the outer chamber through a drain passageway to a point outside of the conduit.

35. The filler neck of claim 19, wherein the closing means includes a support frame attached to the conduit and arranged to lie inside the vent passageway and a closure member mounted to the support frame and arranged to extend through the tube outlet means when the tube means is in its fill passageway-closing position.

36. The filler neck of claim 35, wherein the spring means surrounds the tube means and includes one end engaging the support frame and another end engaging an exterior flange appended to the tube means.

37. The filler neck of claim 35, wherein the support member is formed to include means for conducting liquid fuel discharged from the tube outlet means into the delivering means.

38. A filler neck for use in delivering fuel to a vehicle fuel tank, the filler neck comprising
a conduit including an outer end formed to include a mouth, an inner end formed to include means for delivering fuel to a fuel tank, and a vent passageway extending between the mouth and the delivering means,
a first partition mounted in the conduit to divide the vent passageway into an outer chamber in the outer end of the conduit and an inner chamber in the inner end of the conduit, the first partition is formed to include a first aperture interconnecting the inner and outer chambers,
a closure member mounted in the inner end of the conduit and arranged to extend toward the first partition,
a tube positioned for movement in the vent passageway and formed to include a nozzle-receiving inlet opening, a fuel-discharging outlet opening, and a fill passageway extending between the nozzle-receiving inlet opening and the fuel-discharging outlet opening,
a support flange appended to the conduit and situated in the vent passageway in the inner end of the conduit in spaced-apart relation to the first partition,
a spring urging the tube in the vent passageway into engagement with the first partition to close the first aperture and with the closure member to close the fuel-discharging outlet opening, the spring having one end engaging the support flange and another end engaging the tube.

39. The filler neck of claim 38, wherein the conduit further includes a second partition mounted in the conduit between the mouth and the first partition and formed to include a second aperture and a closure door pivotably coupled to the conduit to move between a first position closing the second aperture and a second position opening the second aperture.

40. The filler neck of claim 39, wherein the first and second partition cooperate to define the outer chamber in the conduit and the first partition includes a pressure-relief valve communicating with the outer and inner chambers.

41. The filler neck of claim 39, wherein the first and second partition cooperate to define the outer chamber in the conduit and the first partition includes a vacuum-relief valve communicating with the outer and inner chambers.

42. The filler neck of claim 39, wherein the first and second partition cooperate to define the outer chamber and the first partition further includes means for draining liquid admitted into the outer chamber through the second aperture through a drain passageway to a point outside of the conduit.

43. The filler neck of claim 38, wherein the first partition is an elongated unit mounted in the conduit and formed to include a central tubular channel defining the first aperture and a plurality of side channels lying around the first aperture and interconnecting the outer and inner chambers in fluid communication.

44. The filler neck of claim 43, wherein the first partition further includes a pressure-relief valve in at least one of the side channels.

45. The filler neck of claim 43, wherein the first partition further includes a vacuum-relief valve in one of the side channels.

46. The filler neck of claim 38, wherein the conduit is formed to include a drainage outlet and the first partition further includes means for draining liquid collecting in the outer chamber through a drain passageway to the drainage outlet for discharge out of the conduit.

47. The filler neck of claim 38, wherein the closure member includes a support frame mounted in the inner chamber to the conduit and means mounted on the support frame for plugging the fuel-discharging outlet opening in the tube and the tube further includes first seal means for sealingly engaging the plugging means upon movement of the tube into engagement with the first portion to block flow of liquid fuel and fuel vapor between the inner and outer chambers through the fill passageway formed in the tube.

48. The filler neck of claim 47, wherein the first seal means includes a sealing ring mounted in the fill passageway.

49. The filler neck of claim 47, wherein the tube further includes second seal means for sealingly engaging a portion of the first partition around the first aperture to block flow of liquid fuel and fuel vapor between the inner and outer chambers and outside of the fill passageway formed in the tube.

50. The filler neck of claim 49, wherein the tube includes an exterior flange engaging said another end of the spring and the second seal means includes a sealing ring coupled to the exterior flange and arranged to face toward the first partition.

51. The filler neck of claim 38, wherein the tube further includes means for sealingly engaging a fuel-dispensing nozzle inserted through the mouth of the conduit into the nozzle-receiving inlet opening in the tube.

52. The filler neck of claim 38, wherein the tube further includes abutment means for engaging a moving fuel-dispensing nozzle inserted into the outer chamber to move the tube against the spring to disengage the tube and the closure member to open the fuel-discharging outlet opening in the tube so that fuel dispensed by the nozzle flows through the fill passageway into the inner chamber for delivery to the fuel tank.

53. The filler neck of claim 52, wherein the abutment means is located in the fill passageway.

54. The filler neck of claim 53, wherein the fuel-dispensing nozzle includes a nozzle member and a fuel vapor recovery boot mounted on the nozzle member and configured to have an outer face, the nozzle member includes an outer end situated to lie a first distance from the outer face of the boot prior to insertion of the nozzle member into the filler neck, the filler neck includes rim means for engaging the outer face of the boot during insertion of the nozzle member into the outer chamber, the abutment means is situated to lie a second distance from the rim means upon movement of the tube to a position engaging the closure member to close the fuel-discharging discharging opening so that the second distance is greater than the first distance to cause any residual tank pressure in the filler neck to be captured in the boot before the tube is moved to open the vent passageway in the conduit.

55. The filler neck of claim 38, wherein the spring is a compression spring surrounding the tube.

* * * * *